United States Patent [19]

Vaglini

[11] Patent Number: 4,691,437

[45] Date of Patent: Sep. 8, 1987

[54] DEVICES FOR APPLYING TERMINALS AND SIMILAR METAL ELEMENTS TO CONDUCTORS, LENGTHS OF ELASTIC MATERIAL AND THE LIKE

[75] Inventor: Franco Vaglini, Gallarate, Italy

[73] Assignee: Siac Industria Accessori Cavaria S.p.A., Varese, Italy

[21] Appl. No.: 823,080

[22] Filed: Jan. 27, 1986

[30] Foreign Application Priority Data

Feb. 21, 1985 [IT] Italy ............................ 19597 A/85

[51] Int. Cl.[4] ........................................ B23P 19/02

[52] U.S. Cl. .................................... 29/753; 29/761; 226/64; 226/68; 74/141.5; 74/834

[58] Field of Search ........... 29/735, 759, 33 M, 564.1, 29/761, 857–859; 226/62, 64, 67, 68; 74/128, 141.5, 834

[56] References Cited

U.S. PATENT DOCUMENTS

| | | | |
|---|---|---|---|
| 2,765,468 | 10/1956 | Cootes et al. | 29/753 |
| 3,747,190 | 7/1973 | Erlichman et al. | 29/753 |
| 3,774,284 | 11/1973 | Cootes | 29/753 |
| 4,381,601 | 5/1983 | Tamai et al. | 29/759 |

*Primary Examiner*—Percy W. Echols
*Attorney, Agent, or Firm*—Ladas & Parry

[57] ABSTRACT

The improvements relate to devices for applying terminals and the like to the ends of filiform bodies such as conductors, lengths of elastic material and other articles. For feeding the metal strip, formed from an interconnected succession of terminals or the like, and for rhythmically moving it into the position in which a terminal is applied to the filiform body and detached from the rest of the strip, the invention provides a pawl, which for this purpose engages the terminal, and is hinged to one end of a lever and subjected to the moment produced by a spring. The lever can rotate about an adjustable point between its ends. At its other end, the lever is hinged to a straight pin adjustably mounted in a guide member. This member is slidably mounted in the frame of the device and carries a roller. This roller cooperates with a cam associated with a mobile head carrying the cutting and bending tools which, respectively, detach the terminal or the like from the rest of the strip and bend its edge over in order to fix it to the conductor or other filiform body.

14 Claims, 5 Drawing Figures

DEVICES FOR APPLYING TERMINALS AND SIMILAR METAL ELEMENTS TO CONDUCTORS, LENGTHS OF ELASTIC MATERIAL AND THE LIKE

This invention relates to improvements in devices for applying terminals and similar metal elements to conductors, lengths of elastic material and other filiform bodies, starting from a strip composed of an interconnected succession of such elements. More precisely, the improvements relate to applicator devices of the type provided with a controllable mobile head carrying tools for detaching an element from the strip and applying it to the end of the filiform body, strip feed means driven by the movement of the head by way of a cam and comprising a pawl and a roller cooperating with said cam, and means for adjusting the feed and the point of commencement of the feed so as to enable the device to operate on metal elements of different shapes and dimensions.

In these applicators, the adjustment and feed means are relatively complicated as they are formed from several members, they require the use of two springs (one acting on the pawl and the other maintaining the roller in contact with the cam), and generally are not completely reliable.

The main object of the present invention is to improve applicator devices of the aforesaid type so as to make them more simple and reliable.

This and further objects which will be more apparent from the detailed description given hereinafter are attained by improvements characterised in that in the feed means the pawl, which is spring-loaded, is supported at one end of a lever of adjustable fulcrum, the other end of which is hinged in an adjustable position to slider means carrying the roller, said adjustable fulcrum forming part of the feed adjustment means, and said hinge of adjustable position forming part of the means for adjusting the feed commencement point.

In a preferred embodiment of the invention, in the feed adjustment means the fulcrum is mounted on a rotatable arm which can be locked in different angular positions, said fulcrum penetrating into an elongated hole of the lever.

According to the preferred embodiment, in the means for adjusting the feed commencement point, the position of the hinge is made adjustable by disposing this latter on a straight pin which is mobile relative to a mobile guide member carrying the roller, said straight pin and said guide member forming part of the said slider means. According to a particular aspect of the invention, an abutment element, acting on the guide member and movable along the straight pin, adjusts the position of this latter relative to the guide member and transmits the thrust of the said spring to the roller.

The invention will be more apparent from the detailed description of a preferred embodiment given hereinafter by way of non-limiting example with reference to the accompanying drawing, in which.

Figure 1:
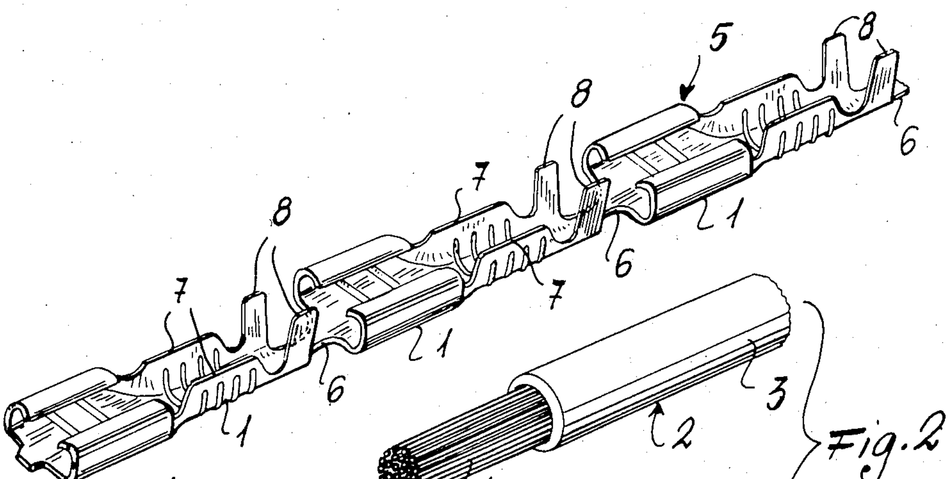
FIG. 1 is a perspective view of a strip of terminals to be fixed, for example, to the end of a conductor as shown in FIGS. 2 and 3, these figures being only explanatory in scope.
Figure 2:
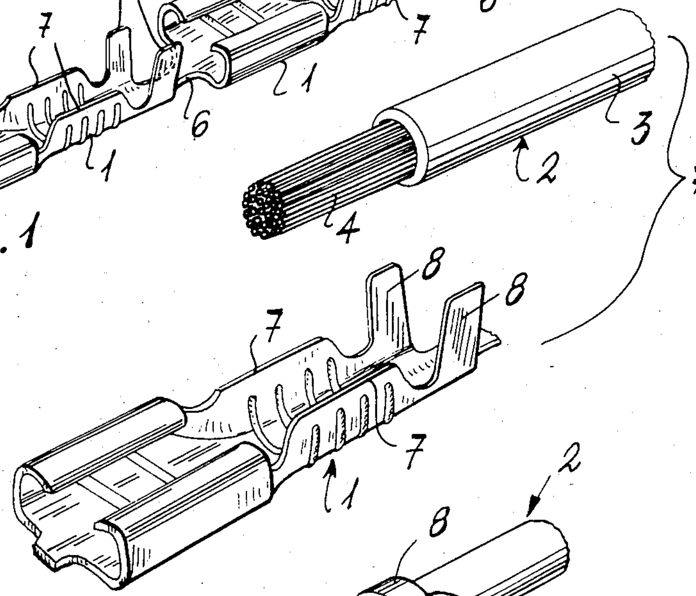
Figure 3:
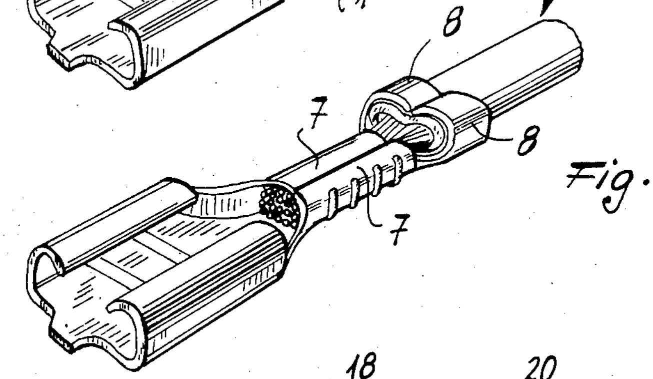
Figure 5:
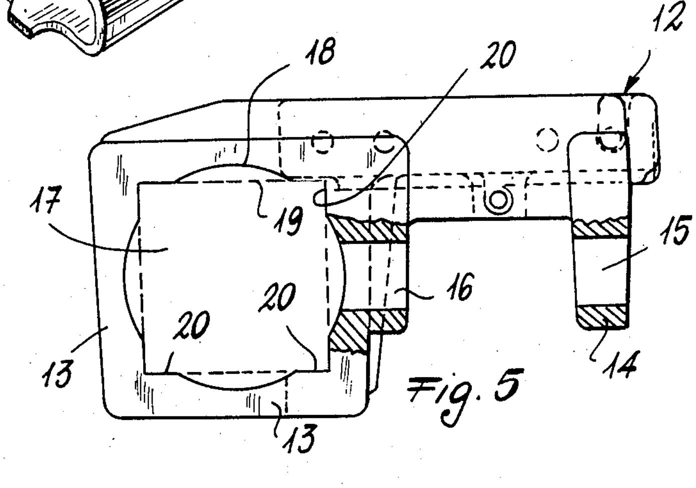
FIG. 5 is a plan view of the frame of the device.

The purpose of the device according to the invention is to apply a metal terminal 1, for example of the type shown in FIGS. 1, 2 and 3, to the end of an electric cable 2 comprising a sheath 3 surrounding the conductor 4, which projects from the ends of the sheath. The terminal is detached from the strip 5 at the point where the terminals are connected together in succession by connection pieces 6. For its fixing to the cable 2, the terminal comprises two pairs of raised lugs 7, 8 of different height which are bent over against the sheath and, respectively, against the conductor by the device of the invention.

For this purpose, the device of the invention comprises a stationary structure 10 formed from a base 11 and frame 12 connected to said base and extending along one side thereof. The frame 12 upperly comprises, projecting above the base 11, an annular part 13 with its axis perpendicular to said base, and a jutting part 14 traversed by a cylindrical bore 15 with its axis forming a right angle with the preceding. This bore is aligned with a corresponding bore 16 which passes through a wall of the ring 13 and opens into the bore 17 of this latter. The cross-section of the bore 17 is such as is ideally obtained by the intersection of a circle 18 with a square 19 where these are coaxial. The right-angled corners 20 serve as a vertical guide for a working head 21 having a cross-section corresponding to that of the square 19. The working head comprises three vertical side-by-side plates connected together. The two outer plates are substantially equal and one of them is visible in FIG. 4, where it is indicated by 22. The intermediate plate is indicated by 23. These plates are kept joined together by screws.

The intermediate plate 23 carries conventional tools 25, 26, 27, used respectively for bending the terminal lugs 7, 8 down and detaching the terminal from the connection piece. They are removaly secured in place by a screw 28. The tool 25, in particular, comprises an elongated hole 30 to allow height-adjustment of the tool by means of a cam 31. This cam is mounted rotatably in a bore 32 of the intermediate plate 23, in which it is retained by a ball 33 loaded by a spring 34 and lying in an annular groove 35 of the cam. This latter acts on the end of the tool 25.

A flanged socket 37 and a disc 38 comprising a series of radially distributed steps 39 of different height are fixed to the top of the intermediate plate 23 by a screw 36. The socket is used to connect the working head 21 in known manner to a press or double-acting cylinder-piston unit which drives the head in the direction of the arrow A. Again in known manner, the disc 38 serves to adjust the extent to which the terminal lugs 7, 8 are bent over, these lugs cooperating for this purpose, in known manner, with a conventional anvil 40 fixed to the base 11.

A cam 41 is removably fixed by screws, not shown, to that side of the intermediate plate facing the bore 16.

A roller 42 presses against the cam 41. The roller 42 is rotatably mounted on a pin 43 supported at its ends by the arms of a fork 44 formed at the end of a tubular slider 45. This slider is slidably mounted in the bores 15 and 16 of the frame 12, and comprises two aligned apertures 46 in an intermediate position. A straight pin 47 threaded at one end at 48 is movably mounted in the slider 45, and is provided with an axial bore 49 threaded at its inner end where a socket head screw 50 locks a transverse pivot 51 which projects from both sides of the straight pin 47 and through the apertures 46 of the slider 45. A nut 52 is screwed onto the threaded part 48 of the straight pin and presses against the right hand end (with reference to FIG. 4) of the slider 45 under the thrust of a spring 53, which is described hereinafter.

The forked end 54 of a lever 55 is hinged to the pivot 51. The lever comprises an axial slot 56 through which a pivot 57 penetrates. The pivot 57 projects from an arm 58 which is hinged at 59 to the frame 12. The arm can be locked in different angular positions by a screw 60, which is screwed into the frame, its shank passing through an arcuate aperture 61 in the arm.

The lever 55 terminates lowerly in a fork at 62, where it supports a pawl 63 mounted rotatably on a pivot 64. This pawl is subjected to the action of the said tension spring 53, which exerts a moment tending to cause it to rotate in the direction of the arrow B, ie towards the strip 5 disposed in a guide 65 (formed from two spaced-apart fillets) present on the base 11. The spring 53 is hooked to the free end of an arm 70 which is bent at a right angle and is screwed into a bore in the frame 12, and locked by the nut 71. This enables the spring tension and the moment tending to rotate the pawl 63 in the direction of the arrow B to be adjusted. In order to adjust this moment, it is necessary only to rotate the arm 70. As is apparent, the spring 53 exerts a moment in the direction of the arrow B on the lever 55, so that the nut 52, by acting on the right-hand end of the slider 45, forces the roller 42 against the cam 41.

Figure 4:
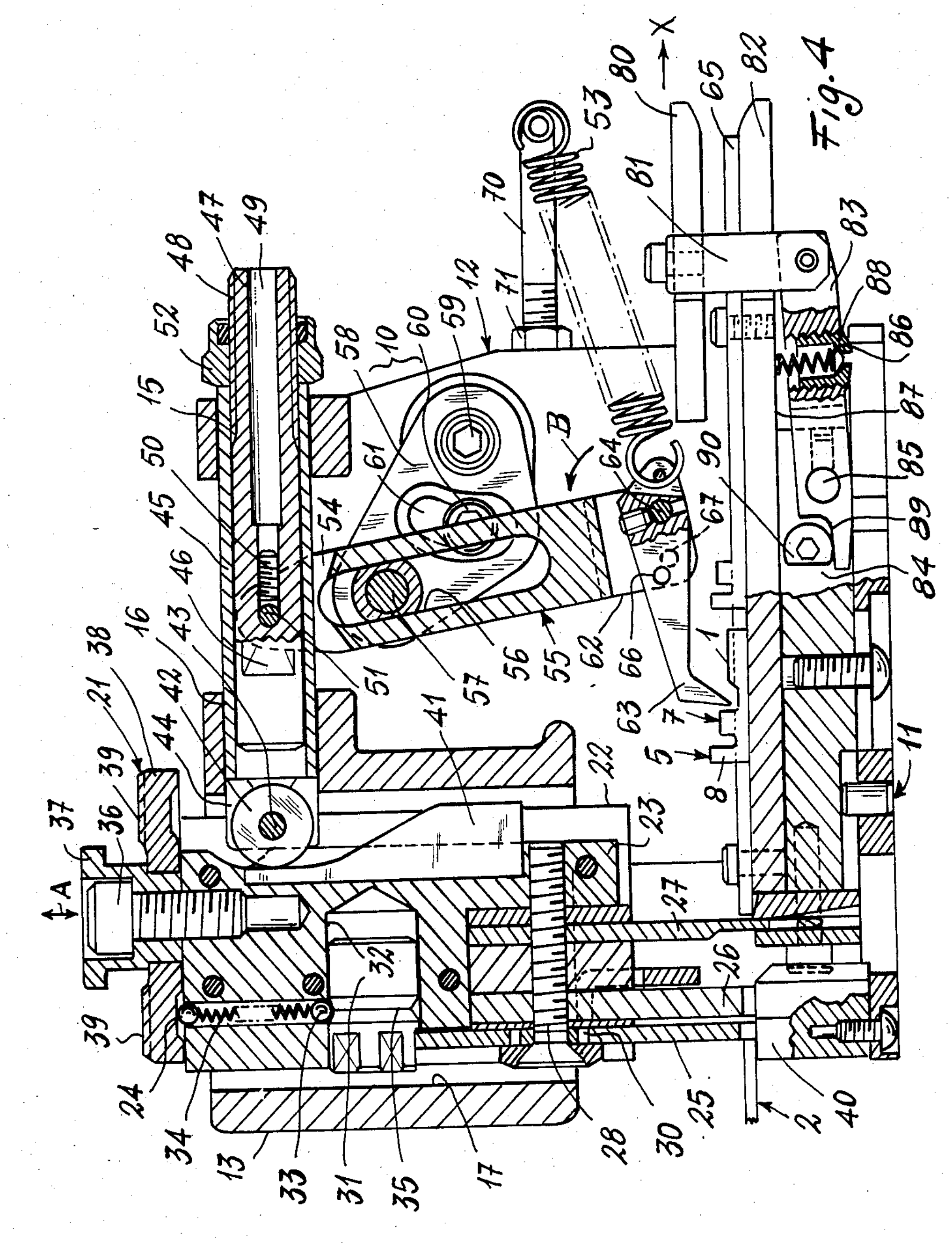
FIG. 4 is a longitudinal vertical section through the device of the invention, with some parts shown in full view.

In FIG. 4, the head 21 is in its lower limiting position in which its tools 25, 26, 27 have detached the terminal 1 and applied it to the cable 2 (FIGS. 1, 2, 3). The pawl 63 is applied against the lower lugs 7 of a terminal 1 of the strip 5.

The working head 21 is raised together with its tools and with the cam 41. On being raised, the cam causes the roller 42 and thus the slider 45 to move towards the right (with reference to FIG. 4). The slider moves the nut 52 and thus also the straight pin 47 in the same direction. The movement of the straight pin results in the rotation of the lever 55 about the pivot 57. This rotation, which takes place in the opposite direction to the arrow B, causes the strip 5 to advance through one step, ie by a distance approximately equal to the length of one terminal, so that a new terminal arrives under the tools 25, 26, 27.

The operator inserts the cable 2 into this new terminal. The head 21 is then lowered. By virtue of the force exerted by the spring 53, the roller 42 follows the cam 41, and the movements described heretofore take place in the reverse direction. The pawl 63 slides along the strip 5 and moves into its new operating position. To prevent the strip 5 from being dragged backwards, ie in the direction of the arrow X during the rearward movement of the pawl, a braking device is provided comprising a plate 80 which presses on a strip and is fixed by a screw to an inverted U-piece 81. The arms of the U-piece embrace a narrow part 82 of the base 11 and are hinged to a lever 83. This lever is situated in a chamber 84 within the base, to which it is hinged by a pivot 85 mounted in the base. A spring 86 acts between the upper wall 87 of the chamber 84 and a bush 88 screwed into the lever 83. This spring tends to rotate the lever 83 in such a manner as to apply the braking plate 80 against the strip. A manually rotatable cam 90 comprising a circular and a flat contour part acts against the reduced-height end 89 of the lever 83. The plate 80 is in its braking position only when the flat part of the cam acts on the lever 83.

What is claimed is:

1. An improved device for applying terminals and similar metal elements to conductors, to lengths of elastic material and to other filiform bodies, starting from a strip composed of an interconnected succession of such elements, said device comprising a load-bearing structure, a controllable mobile head carrying tools for detaching an element from the strip and applying it to the end of the filiform body, strip feed means driven by the movement of the head by way of a cam and comprising a roller cooperating with said cam, and means for adjusting the feed and the point of commencement of the feed, characterized in that in the feed means a pawl, which is loaded by a spring, is mounted on a lever which has an adjustable fulcrum and is hinged to slider means carrying the roller, said adjustable fulcrum forming part of the feed adjustment means and a hinge of adjustable position forming part of the means for adjusting the feed commencement point.

2. The device as claimed in claim 1, wherein in the feed adjustment means, the fulcrum is mounted on a rotatable arm which can be locked in different angular positions, said fulcrum penetrating into an elongated hole of the lever.

3. The device as claimed in claim 1, wherein in the means for adjusting the feed commencement point, the position of the hinge is made adjustable by disposing this latter on a straight pin which is mobile relative to a mobile guide member carrying the roller, said straight pin and said guide member forming part of the slider means.

4. The device as claimed in claim 1, wherein an abutment element, acting on the guide member and movable along the straight pin, adjusts the position of this latter relative to the former and transmits the thrust of the spring to the roller.

5. The device as claimed in claim 1, wherein the tension of the spring is adjustable.

6. The device as claimed in claim 3, wherein the straight pin is mounted inside the guide member, which comprises apertures through which the hinge for the lever is formed.

7. The device as claimed in claim 6, wherein the guide member is slidably mounted in supports of the load-bearing structure.

8. The device as claimed in claim 7, wherein the load-bearing structure comprises a projecting annular part defining a guide bore having a cross-section formed by the intersection of a circle with a rectangle or square.

9. The device as claimed in claim 8, wherein the roller, cooperating with the cam mounted in the head, penetrates into the bore.

10. The device as claimed in claim 1, wherein the head comprises a block of side-by-side plates, of which the intermediate plate carries the cam.

11. The device as claimed in claim 1, wherein a cam for adjusting one of the tools is mounted in the head.

12. The device as claimed in claim 1, comprising braking means acting on the strip.

13. The device as claimed in claim 12, wherein the braking means comprise a braking plate hinge-supported by a lever loaded by a spring.

14. The device as claimed in claim 13, wherein a manually controlled cam excludes or engages the braking means by acting on the lever.

* * * * *